United States Patent
Li et al.

(10) Patent No.: US 11,323,847 B2
(45) Date of Patent: May 3, 2022

(54) SYSTEMS AND METHODS FOR DETERMINING A POSITION OF A TERMINAL DEVICE USING A HIDDEN MARKOV MODEL

(71) Applicant: BEIJING DIDI INFINITY TECHNOLOGY AND DEVELOPMENT CO., LTD., Beijing (CN)

(72) Inventors: Yan Li, Beijing (CN); Weihuan Shu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 96 days.

(21) Appl. No.: 16/735,741

(22) Filed: Jan. 7, 2020

(65) Prior Publication Data
US 2020/0204956 A1 Jun. 25, 2020

Related U.S. Application Data

(63) Continuation of application No. PCT/CN2018/095031, filed on Jul. 9, 2018.

(30) Foreign Application Priority Data

Jul. 7, 2017 (CN) .......................... 201710552943.9
Nov. 3, 2017 (CN) .......................... 201711070091.6

(51) Int. Cl.
*H04W 4/00* (2018.01)
*H04W 4/029* (2018.01)
*H04W 4/02* (2018.01)

(52) U.S. Cl.
CPC ........... *H04W 4/029* (2018.02); *H04W 4/027* (2013.01)

(58) Field of Classification Search
CPC ............................ H04W 4/029; H04W 4/027
See application file for complete search history.

(56) References Cited

U.S. PATENT DOCUMENTS 8,855,912 B2 * 10/2014 Miura ................ G01C 21/3697
701/400
2014/0315583 A1 10/2014 Yin
(Continued)

FOREIGN PATENT DOCUMENTS

CN 103067852 A 4/2013
CN 103152745 A 6/2013
(Continued)

OTHER PUBLICATIONS

The Second Office Action in Chinese Application No. 201711070091.6 dated Jun. 10, 2020, 15 pages.
(Continued)

*Primary Examiner* — Pakee Fang
(74) *Attorney, Agent, or Firm* — Bayes PLLC

(57) ABSTRACT

Embodiments of the disclosure provide methods and systems for determining a position of a terminal device. The system may include a receiving module configured to receive current position information associated with the terminal device, the current position information including one or more positions indicative of the present location of the terminal device. The system may further include an acquisition module configured to acquire historical position information associated with the terminal device, said historical position information being separated from the current position information by a predetermined time interval. The system may further include a determination module configured to determine, based on the historical position informa-
(Continued)

tion, an actual position of the terminal device from the current position information.

20 Claims, 10 Drawing Sheets

(56) References Cited

U.S. PATENT DOCUMENTS

| | | | | |
|---|---|---|---|---|
| 2015/0345970 | A1* | 12/2015 | Tanaka | G01C 21/3617 701/521 |
| 2015/0373493 | A1* | 12/2015 | Chowdhury | H04W 4/21 455/456.3 |
| 2016/0057639 | A1* | 2/2016 | Smith | H04W 4/029 455/423 |
| 2017/0146349 | A1 | 5/2017 | Yang et al. | |
| 2017/0287085 | A1* | 10/2017 | Smith | H04W 4/025 |

FOREIGN PATENT DOCUMENTS

| | | |
|---|---|---|
| CN | 103415070 A | 11/2013 |
| CN | 103455417 A | 12/2013 |
| CN | 104469942 A | 3/2015 |
| CN | 104931051 A | 9/2015 |
| CN | 105491522 A | 4/2016 |
| CN | 106123906 A | 11/2016 |
| CN | 106612494 A | 5/2017 |
| CN | 106767873 A | 5/2017 |
| CN | 106912102 A | 6/2017 |
| EP | 1418684 A2 | 5/2004 |
| WO | 2016200868 A1 | 12/2016 |

OTHER PUBLICATIONS

International Search Report in PCT/CN2018/005031 dated Sep. 27, 2018, 4 pages.
Written Opinion in PCT/CN2018/005031 dated Sep. 27, 2018, 4 pages.
First Office Action in Chinese Application No. 201711070091.6 dated Nov. 26, 2019, 15 pages.
Xie, Jinyun, Real Time Flow Map Matching Method and Implementation of GPS Track of Floating Car, China Excellent Master's Thesis Full-text Database Engineering Science and Technology Series, 2017, 33 pages.
Mind Puzzle, Map Matching Algorithm Based on Hidden Markov Model, 2014, 25 pages.
First Office Action issued in corresponding Chinese Application No. 201880043725 5, dated Oct. 11, 2021, 7 pages.
Mind Puzzle, Map Matching Algorithm Based on Hidden Markov Model, 2014, 15 pages.
Xie, Jinyun, An Efficient Map Matching Algorithm and Architecture for Large-scale Vehicle GPS Stream Data, China Excellent Master's Thesis Full-text Database, 2016, 64 pages.

* cited by examiner

SYSTEMS AND METHODS FOR DETERMINING A POSITION OF A TERMINAL DEVICE USING A HIDDEN MARKOV MODEL

CROSS REFERENCE TO RELATED APPLICATIONS

The present application is a continuation of International Application No. PCT/CN2018/095031, filed Jul. 9, 2018, which is based on and claims the benefits of priority to Chinese Application No. 201710552943.9, filed Jul. 7, 2017, and Chinese Application No. 201711070091.6, filed Nov. 3, 2017, the entire contents of each of which are incorporated herein by reference.

TECHNICAL FIELD

The present disclosure relates to systems and methods for determining a position of a terminal device, and more particularly to, systems and methods for determining a position of a terminal device in a map using current and historical position information of the terminal device.

BACKGROUND

With the advancement of mobile communication and positioning systems, it has become common for a user to use applications with digital map applications to identify the user's location and navigation applications to guide the user's travel. This technology makes it possible for an online hailing platform (e.g., DiDi™ online) to provide rideshare services to users whose smartphones are equipped with such applications. For a real-world example, a user having a smartphone with a navigation map that receives Global Positioning System ("GPS") signals can instantly recognize his or her location by just looking at the cellphone display. This is because the received signals are processed into location data (e.g. coordinates) shown on the display of the smartphone, therefore informing the user of where in the map he or she is currently located. The online hailing platform may also obtain the location of a user, who may be a passenger or a transportation service provider (e.g., a taxi driver, a private car owner, or the like), so that the passenger and the transportation service provider may know each other's location, therefore facilitating an easy passenger pick-up.

However, due to various influences, such as obstruction of GPS signals and fast-moving speed of the transportation vehicle, the location data sometimes may not be the true location of the user. This has caused deviations in the positioning result and also brings frustration to both the passenger and the service provider, and thus potentially reduces their enthusiasm in using the rideshare services.

In addition, navigation services are indispensable features to a driver, who on average uses twice such services when taking a hailing request from a passenger, a frequency much higher than the passenger. For drivers unfamiliar with the routes and geography of the roads, the navigation services need to accurately determine both the destination (usually the location of the passenger) and the navigation route to that destination. Therefore, knowing the accurate locations of both the passenger and the driver is a key factor in improving service quality and general efficiency of the online hailing platform.

Some approaches have been proposed to try to solve this positioning inaccuracy. To approximate the user location, the backend services of an application calculate and return multiple pieces of possible position information. The Software Development Kit ("SDK") embedded in the application with a positioning module selects, as the user location, one piece of position information that has the highest confidence level. A confidence level is used to describe the probability that the calculated and returned position may be the true location. Different approaches may be used to determine the confidence level. For example, if three pieces of position information—A, B, and C—are returned from the backend services, and position information A is selected as the user location most of the time, position information A then has the highest confidence level.

Despite such efforts, the position information with the highest confidence level oftentimes may not accurately represent the true location of the user due to its inherent nature of statistical approximation. Consequently, to address the above problems, there is a need for systems and methods that may more accurately determine the location of the user.

SUMMARY

Embodiments of the disclosure provide a system for determining a position of a terminal device. The system may include a receiving module configured to receive current position information associated with the terminal device, the current position information including one or more positions indicative of the present location of the terminal device. The system may further include an acquisition module configured to acquire historical position information associated with the terminal device, said historical position information being separated from the current position information by a predetermined time interval. The system may further include a determination module configured to determine, based on the historical position information, an actual position of the terminal device from the current position information.

Embodiments of the disclosure also provide a method for determining a position of a terminal device. The method may include receiving current position information associated with the terminal device, the current position information including one or more positions indicative of the present location of the terminal device. The method may further include acquiring historical position information associated with the terminal device, the historical position information being separated from the current position information by a predetermined time interval. The method may further include determining, based on the historical position information, an actual position of the terminal device from the current position information.

Embodiments of the disclosure further provide a non-transitory computer-readable medium having instructions stored thereon that, when executed by one or more processors, causes the one or more processors to perform operations. The operations may include receiving current position information associated with the terminal device, the current position information including one or more positions indicative of the present location of the terminal device. The operations may further include acquiring historical position information associated with the terminal device, the historical position information being separated from the current position information by a predetermined time interval. The operations may further include determining, based on the historical position information, an actual position of the terminal device from the current position information.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1A:
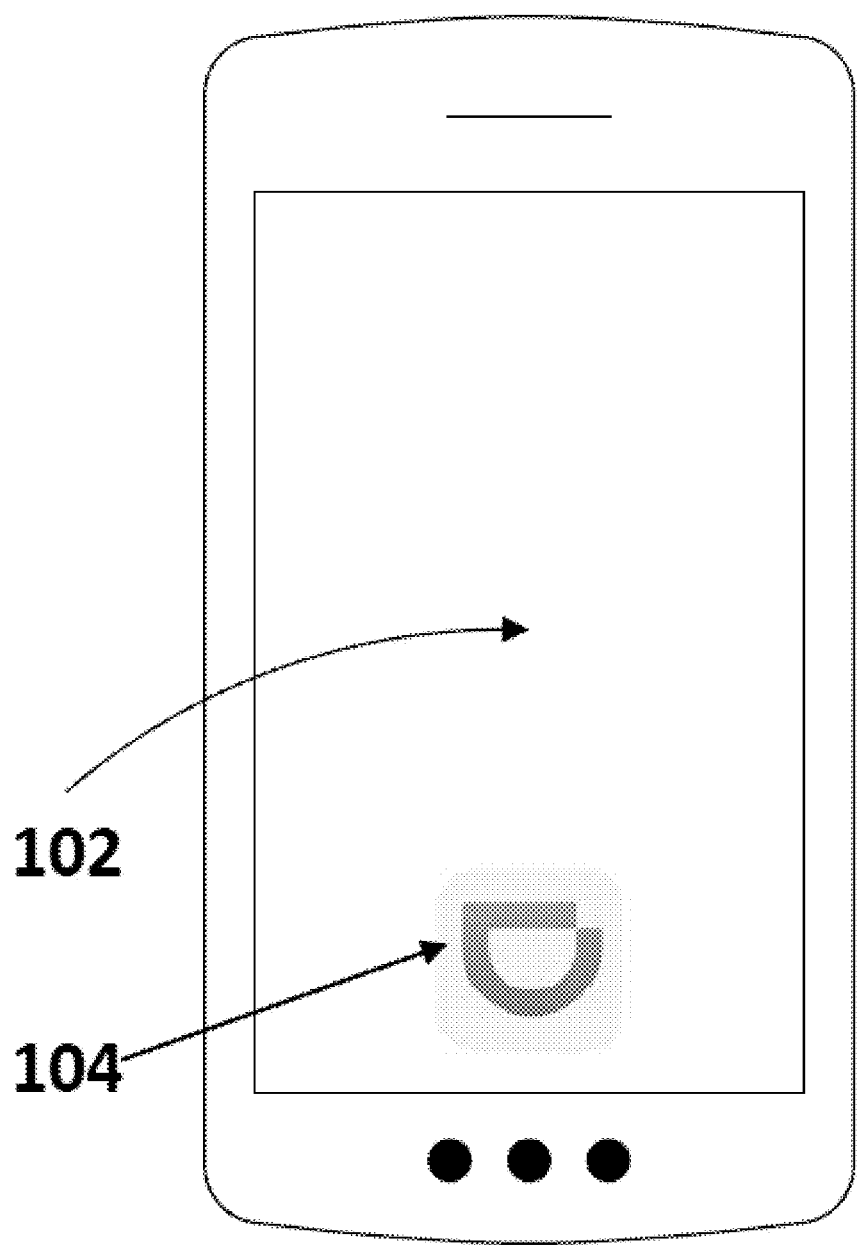
FIG. 1A illustrates a schematic diagram of an exemplary terminal device, according to embodiments of the disclosure.
Figure 1B:
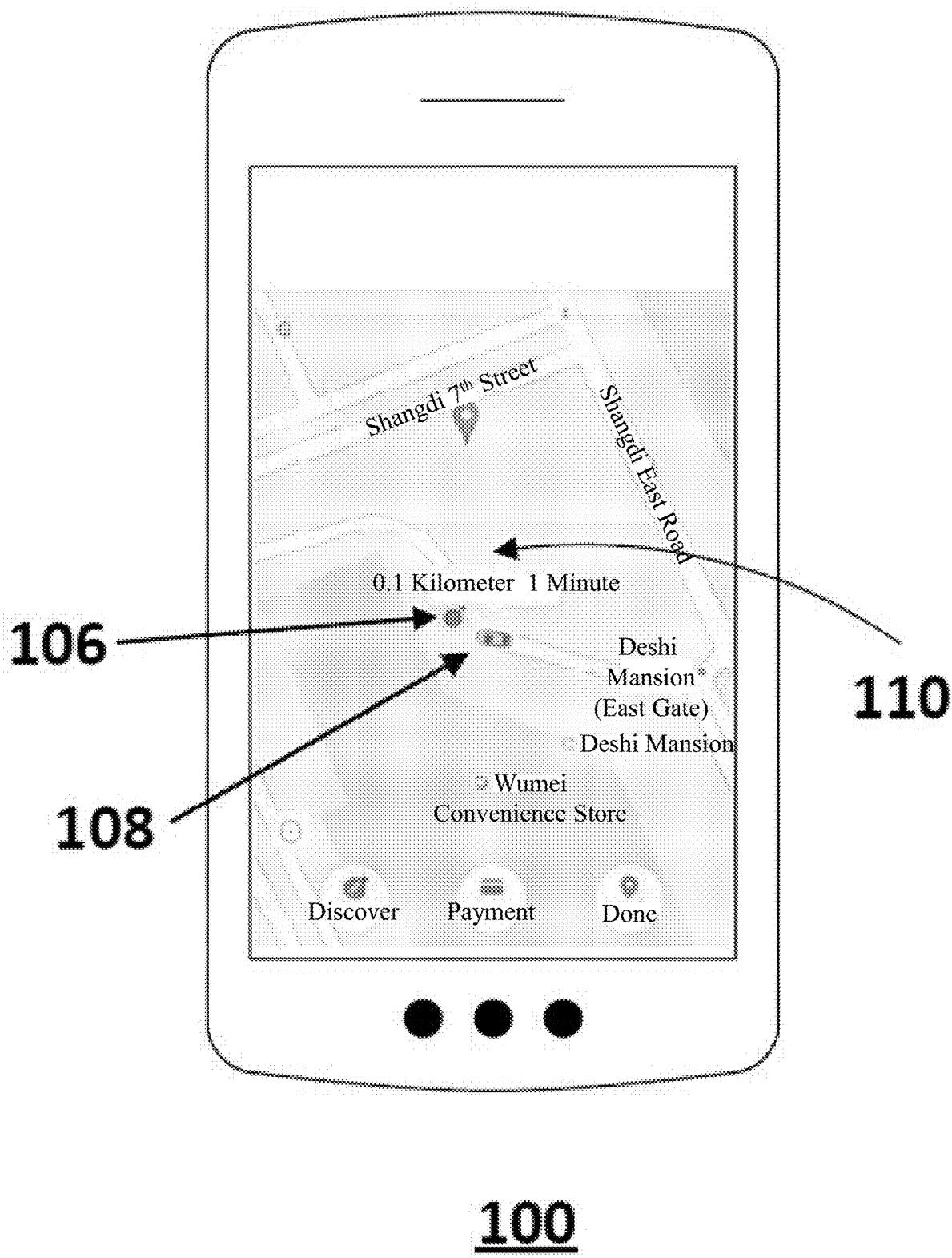
FIG. 1B illustrates another schematic diagram of an exemplary terminal device, according to embodiments of the disclosure.

FIGS. 1A and 1B illustrate schematic diagrams of an exemplary terminal device 100, according to embodiments of the disclosure. Terminal device 100 may include any suitable device that can interact with a user, e.g., a smartphone, a Personal Digital Assistant ("PDA"), a tablet, a wearable device, a computer, an in-vehicle smart display, or the like. In some embodiments, terminal device 100 may be a driver terminal used by the transportation service provider. In some other embodiments, terminal device 100 may be a passenger terminal used by the passenger requesting the transportation service. Description of terminal device 100 will be made using a passenger terminal as an example, but one skilled in the art will be able to adapt the described features of terminal device 100 to a driver terminal.

As shown in FIG. 1A, terminal device 100 may be a smartphone with a display 102. Display 102 may show an icon 104 of the application that the passenger uses to request transportation service. Consistent with the present disclosure, the application is equipped with mapping functions that provide real-time position information with respect to at least one of the passenger and the transportation service provider, which may be interchangeably referred to as (but not limited to) a driver according to the present disclosure. The application can be pre-installed in the memory/storage of terminal device 100 or downloaded from online app stores.

Once the user opens the application by clicking or tapping on icon 104, display 102 shows a map 110 thereon, as shown in FIG. 1B. A dot 106 in the middle of map 110 indicates the location of the passenger. A car logo 108 next to dot 106 indicates the location of the driver. For purposes of the present disclosure, the location of the user (e.g., passenger, driver, or the like) is used interchangeably with the location of the user's terminal device, as the user almost always carries the terminal device when requesting hailing service. However, one skilled in the art will understand that when the user and the terminal device are separated by a far distance in the unlikely event, all position information will refer to that of the terminal device.

In some embodiments, the location of terminal device 100 may be generated by GPS-enabled component equipped with terminal device 100. The generated position information is processed inside terminal device 100 and subsequently shown on display 102. Alternatively, the location of terminal device 100 may be generated by GPS-enabled component inside another device (e.g., a smart watch) that is carried by or adjacent to the user and coupled to terminal device 100. In such a case, a wireless or wired communication channel (e.g., Bluetooth) may be established between that device and terminal device 100 in order for terminal device 100 to receive the position information and to display its location on display 102.

In some embodiments, the location of the driver may be generated by GPS-enabled component equipped with another terminal device (not shown) carried by the driver. The generated position information is processed inside the driver's terminal device. To display the location of the driver on terminal device 100, the driver's terminal device may establish a wired or wireless communication channel (e.g., 4G LTE networks) through which its position information is transferred to a server (e.g., an application server of the online hailing platform) and then to the passenger's terminal device 100.

Although the above embodiments describe in detail the GPS position information, one skill in the art may also employ other technologies or mechanisms to obtain the position information of the user. In some embodiments, other than GPS satellites, GLONASS satellites or BeiDou satellites also provide position information to terminal devices equipped to receive signals containing such information. In some embodiments, a terminal device connected to a cellular network may find its location based on the known geographical coordinates of base stations in the cellular network, with which the device has communicated or is communicating. In some embodiments, the location of the terminal device may also be determined based on the Wi-Fi networks it connects to and/or the locations of which are known or can be estimated.

Figure 2:
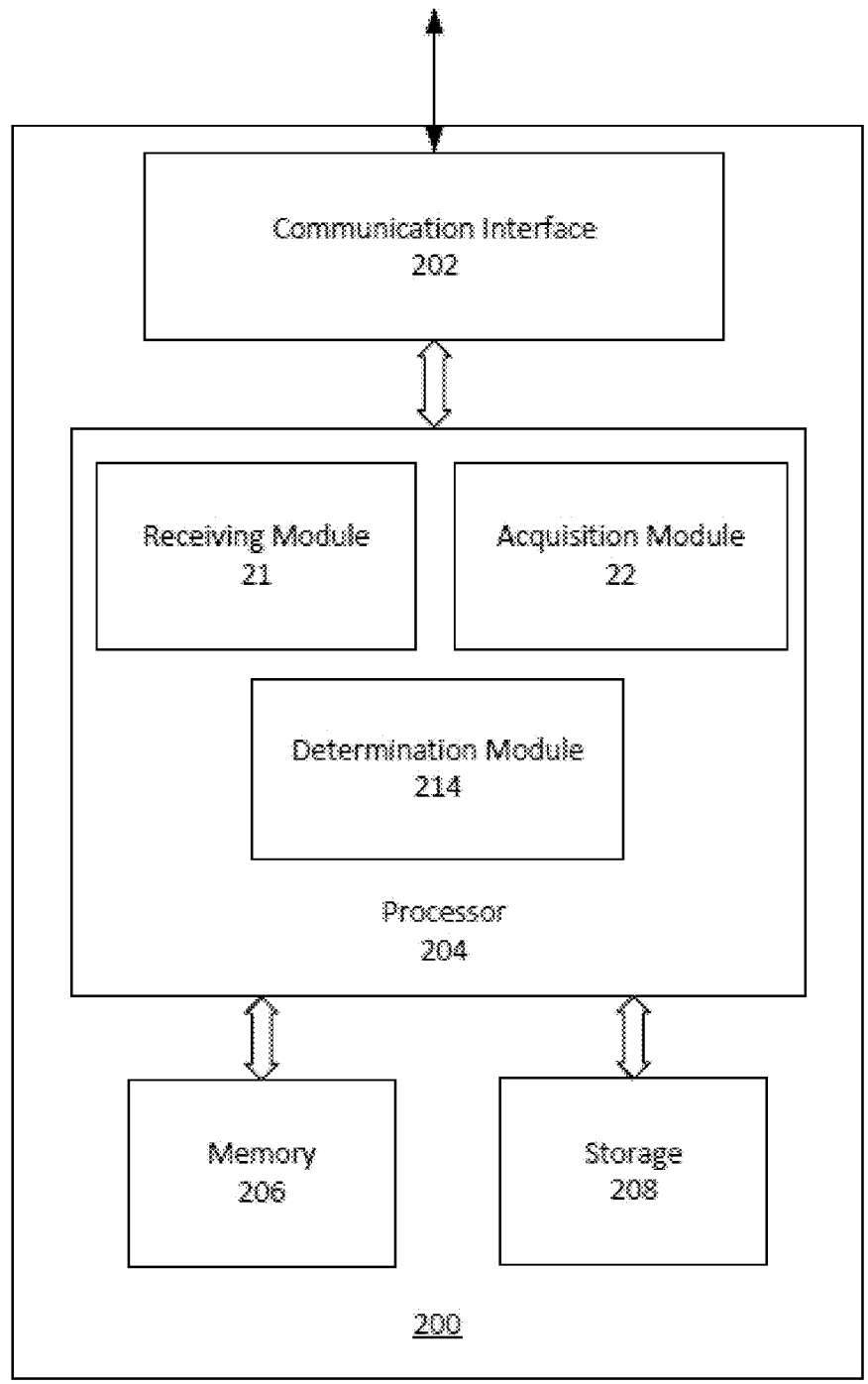
FIG. 2 illustrates a block diagram of an exemplary embodiment of the system for determining a position of a terminal device, according to embodiments of the disclosure.

FIG. 2 illustrates a block diagram of an exemplary embodiment of a system 200 for determining a position of a terminal device. As shown in FIG. 2, system 200 according to embodiments of the disclosure may include a communication interface 202, a processor 204, a memory 206, and a storage 208. In some embodiments, system 200 may have different modules in a single device or separate devices with dedicated functions.

Communication interface 202 may send data to and receive data from components outside system 200 via communication cables, a Wireless Local Area Network (WLAN), a Wide Area Network (WAN), wireless networks such as radio waves, a nationwide cellular network, and/or a local wireless network (e.g., Bluetooth™ or WiFi), or other communication methods. In some embodiments, communication interface 202 can be an integrated services digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a network. In some embodiments, after receiving data from components outside system 200, communication interface 202 may provide the received data to memory 206 or storage 208 for storage or to processor 204 for processing.

Processor 204 may include any appropriate type of general-purpose or special-purpose microprocessor, digital signal processor, or microcontroller. Processor 204 may be configured as a separate processor module dedicated to determining a position of a terminal device. Alternatively, processor 204 may be configured as a shared processor module for performing other functions unrelated to position determination.

Memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform position determination. For example, memory 206 and/or storage 208 may be configured to store program(s) that may be executed by processor 204 to perform any of the functions embodied in modules 21, 22, and 23.

As shown in FIG. 2, processor 204 may include multiple modules, such as a receiving module 21, an acquisition module 22, and a determination module 23. These modules (and any corresponding sub-modules or sub-units) can be hardware units (e.g., portions of an integrated circuit) of processor 204 designed for use with other components or to execute a part of a program. The program may be stored on a computer-readable medium, and when executed by processor 204, it may perform one or more functions. Although FIG. 2 shows modules 21, 22, and 23 all within one processor 204, it is contemplated that these units may be distributed among multiple processors located near or remotely with each other.

In some embodiments, receiving module 21 may receive current position information associated with the terminal device, which includes one or more positions indicative of the present location of the terminal device. Such current position information may be provided from a backend. The backend may be a portion of the terminal device capable of executing the position determination function according to the present disclosure. Alternatively, the backend may also be a server equipped with the position determination function.

In some embodiments, acquisition module 22 may acquire historical position information associated with the terminal device, which is separated from the current position information by a predetermined time interval. The time interval may be discretionarily set as long as the current and the historical position information differ meaningfully so that they can be used to determine the actual position of the terminal device. One example of the time interval is 5 seconds.

The historical position information represents the position information of the terminal device within the predetermined time interval, which can be a moving trajectory of the terminal device that includes all traveled positions, or can alternatively be one or more positions of the terminal device. The system according to the present disclosure stores or caches historical position information of the terminal device so that it can be retrieved when requested. The range of the stored or cached historical position information at least traces back to a time stamp beyond the predetermined time interval. The historical position information may be saved in memory 206 or storage 208 inside system 200, but not necessarily within the terminal device. If the historical position information is saved outside the terminal device, a communication channel may need to be established between the terminal device and the memory 206 or storage 208 in order for the terminal device to retrieve the information. In some embodiments, the historical position information includes at least one or more locations of the terminal device at the time when it receives current position information.

When a request for identifying positions is initiated by, for example, the software application, the backend provides the current position information to be processed by the terminal device. The software application may be pre-installed in or downloaded to the terminal device. Regardless whether the backend is a portion of the terminal device or a server, the time delay is negligible due to the high-speed transmission of the position information in the form of digital data inside the terminal device or via communication networks. Thus, the locations of the terminal device between the time of request initiation and that of receiving current position information can be deemed to be the same or within negligible distance.

In some embodiments, determination module 23 determines, based on the historical position information, the actual position of the terminal device from the current position information. For example, the actual position of the terminal device can be obtained by determining which position among the one or more positions embodied in the current position information is the closest to the present location of the terminal device. Once determined, that position is deemed as the actual location of the terminal device. Alternatively, the actual position of the terminal device can be obtained by calculating the moving tendency of the terminal device based on a historical moving trajectory or multiple historical positions of the terminal device. Once calculated, actual position of the terminal device is determined from the current position information according to the moving tendency.

Figure 3:
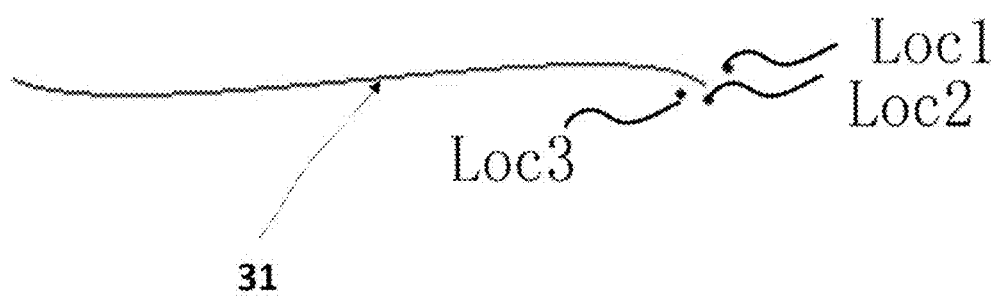
FIG. 3 illustrates a diagram of an exemplary positioning scheme, according to embodiments of the disclosure.

FIG. 3 illustrates a diagram of an exemplary positioning scheme, according to embodiments of the disclosure. The curved line 31 represents a moving trajectory of the terminal device, and Loc1, Loc2, and Loc3 represent positions embodied in the position information transmitted from the backend. The distances between the ending point of the moving trajectory and each of the three positions are calculated, and the moving tendency of the moving trajectory can be estimated, therefore concluding that Loc2, for example, is the present location of the terminal device. This positioning scheme may employ various computerized applications of algorithms to determine the present location of the terminal device, one of which using Hidden Markov Model ("HMM") will be described in detail below in conjunction with FIGS. 5 to 8.

The system according to the present disclosure receives current and historical position information associated with the terminal device, and determines, based on the historical position information, the actual position of the terminal device from the current position information. Therefore, the system greatly improves positioning accuracy and solves the problem in the existing systems that solely relies upon confidence level for calculating the true location of the terminal device.

Figure 4:
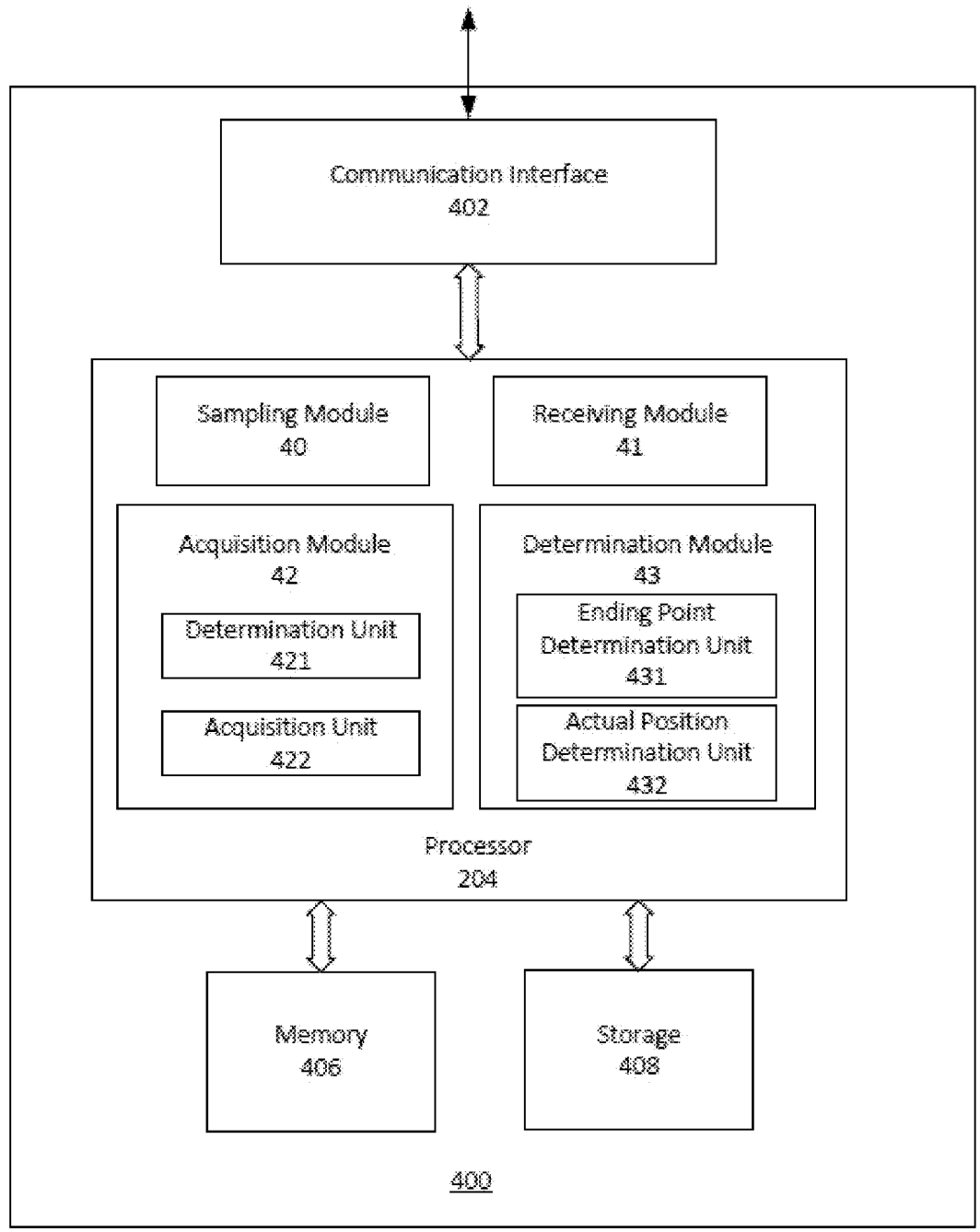
FIG. 4 illustrates a block diagram of another exemplary embodiment of the system for determining the location of a terminal device, according to embodiments of the disclosure.

FIG. 4 illustrates a block diagram of another exemplary embodiment of a system 400 for determining the location of a terminal device. Similar to system 200 in FIG. 2, system 400 according to embodiments of the disclosure may include a communication interface 402, a processor 404, a memory 406, and a storage 408. In some embodiments, system 400 may have different modules in a single device or separate devices with dedicated functions. Components in system 400 that have similar functions and configurations will not be elaborated herein.

In addition to the three modules 41, 42, and 43 similar to those described in conjunction with FIG. 2, system 400 in this embodiment further includes a sampling module 40. By software installed in the terminal device, sampling module 40 samples positioning data from the terminal device. The positioning data is used to calculate the current position information. The positioning data may include GPS positioning results, identifiers and strengths of signals from surrounding base stations detected by the terminal device, identifiers and strengths of Wi-Fi signals, etc. Different types of positioning data may be obtained by different sensors in the terminal device.

The system may further include a transmission module (not shown) that has access to the backend. In some embodiments, the transmission module may have functions partially or entirely performed by communication interface 402. The transmission module may transmit the positioning data to the backend, which may calculate current position information based on the positioning data. The calculation may take into account one or more types of positioning data, such as the GPS data, base station data, Wi-Fi data, etc., so that one or more positions indicative of the present location of the terminal device may be calculated. The resulted current position information is transmitted to receiving module 41 for further processing.

Consistent with some embodiments according to the present disclosure, acquisition module 42 in system 400 may include a determination unit 421 and an acquisition unit 422. Determination unit 421 determines the starting time that is separated by the predetermined time interval from the time of receiving the current position information. As described above, the time interval may be set at an appropriate length according to needs. For example, it is set at 2 minutes in this embodiment. With this time interval available, the starting time may be determined to be a time that is 2 minutes prior to receiving the current position information.

Acquisition unit 422 obtains the initial position of the terminal device at the starting time and generates initial position information. System 400 may decide whether the terminal device at the starting time was indoor or outdoor, which adds additional parameters to the initial position information for subsequent processing. For example, if the terminal device is detected to have received GPS signals at the starting time, it is decided that the terminal device was outdoor, and the initial position information may be generated with the GPS coordinates at the starting time. If the terminal device has not received GPS signals at the starting time, it is decided that the terminal device was indoor. In this case, the last GPS signal received by the terminal device is used instead, and the initial position at the starting time may be decided according to both the GPS coordinates corresponding to the last received GPS signals and the moving trajectory of the terminal device subsequent to the disappearance of GPS signals.

With reference to the initial position information, acquisition unit 422 further acquires a moving trajectory of the terminal device during the predetermined time interval. The moving trajectory can be calculated using computerized applications of algorithms, for example, dead reckoning. This algorithm is useful in scenarios where a previously-determined position and a known or estimated speed are available. The previously-determined position in this case is the initial position. The speed can be estimated according to different scenarios. For example, when the user is a passenger, the moving trajectory can be calculated using the Pedestrian Dead Reckoning ("PDR") algorithm. Sensors onboard the terminal device carried by the passenger may detect the step length, number of steps, direction, and other motion data of the passenger. Thus, the moving trajectory of the terminal device can be calculated with the PDR algorithm based on such data.

Types of sensors onboard the terminal device include accelerometer, gyroscope, magnetometer, etc., and their applications are not limited to moving trajectory calculation using the dead reckoning algorithm.

Determination unit 421 determines the historical position information of the terminal device based on the moving trajectory of the terminal device. An example will be used to explain how system 400 obtains historical position information when the terminal device is indoor. Assuming the terminal device is inside a shopping mall and the GPS signals are not available, system 400 decides whether the terminal device has received GPS signals at the starting time. If the answer is no, the last GPS signal received by the terminal device is retrieved, and a first moving trajectory between the time point of last receipt of GPS signals and the starting time can be calculated. Based on the first moving trajectory, an initial position of the terminal device at the starting time may be obtained. Subsequently, a second moving trajectory subsequent to the starting time can be likewise calculated. Thus, the historical position information may be determined based on the second moving trajectory.

When the terminal device was outdoor at the starting time, the determination of historical position information is easier than the above example as the first moving trajectory no longer needs to be calculated because the available GPS signals provide a relatively precise location of the terminal device at the starting time. In such a case, the moving trajectory can be determined based on the GPS coordinates acquired by the terminal device during the predetermined time interval. In some embodiments, the GPS coordinates represent discrete dots along the moving trajectory. Joining up the dots will generate an approximate moving trajectory of the terminal device.

To achieve higher accuracy of the generated moving trajectory of the terminal device as opposed to its actual moving trajectory, two or more acquired moving trajectories can be cross-referenced to reduce errors and deviation. Any of the referenced moving trajectories may be one generated by indoor calculation (e.g., with dead reckoning) or by outdoor calculation (e.g., with GPS coordinates). In one example, two moving trajectories acquired by indoor calculation may be used. In another example, one moving trajectory acquired by indoor calculation and one by outdoor calculation may be used.

Consistent with some embodiments according to the present disclosure, determination module 43 in system 400 may include an ending point determination unit 431 and an actual position determination unit 432. Ending point determination unit 431 determines the ending point of the moving trajectory, which is the point in the moving trajectory that has the latest time. Depending on the number of moving trajectories, there can be one or more ending points in one calculation. These one or more ending points are collectively embodied in the ending position information, which in turn constitutes the historical position information.

Actual position determination unit 432 compares the ending position information with the current position information and determines the actual position of the terminal device from the current position information. The comparison can be carried out in multiple ways. Two implementations will be explained below, but one should not limit the embodiments of the present disclosure to these two implementations.

In a first example, the distances between the ending point (embodied in the ending position information) and each of the one or more positions indicative of the present location of the terminal device (embodied in the current position information) are calculated. As one exemplary and non-limiting selection criterion, the position with the shortest distance from the ending point is determined to be the actual position of the terminal device.

In a second example, a moving tendency of the terminal device is used to find the actual position from the current position information including one or more positions indicative of the present location of the terminal device. As one exemplary and non-limiting selection criterion, the position that falls within the most proximity to the calculated moving tendency is determined to be the actual position of the terminal device.

Although not shown in the figures, in some embodiments, determination module 43 according to the present disclosure may include a second acquisition unit that acquires confidence levels corresponding to the one or more positions embodied in the current position information, a correction unit that corrects the acquired confidence levels based on the historical position information, and a second determination unit that determines the position with the highest final confidence level to be the actual position of the terminal device. The resulted actual position is more precise than the one obtained by the existing systems, because the accuracy of confidence levels is improved by the correction processing carried out in the correction unit.

The number and type of units within modules 42 and 43 and the exact places of each type of the processing executed therein (that is, determination of starting time, obtaining of initial position, acquisition of moving trajectory, determination of historical position information, determination of ending point, comparison between ending position information and current position information, determination of actual position, acquisition of confidence levels, and correction of confidence levels) are not confined to the above embodiments. Alternatively, each module may selectively have one or more independent units dedicated to one or more types of the processing. In some embodiments, any unit may contain a single or a combination of the above processing regardless of the number of units in one module. As long as the purpose of the present disclosure is achieved, the combination and the place of the processing with respect to the modules and units may be properly adjusted and are not limited to the above embodiments.

Figure 5:
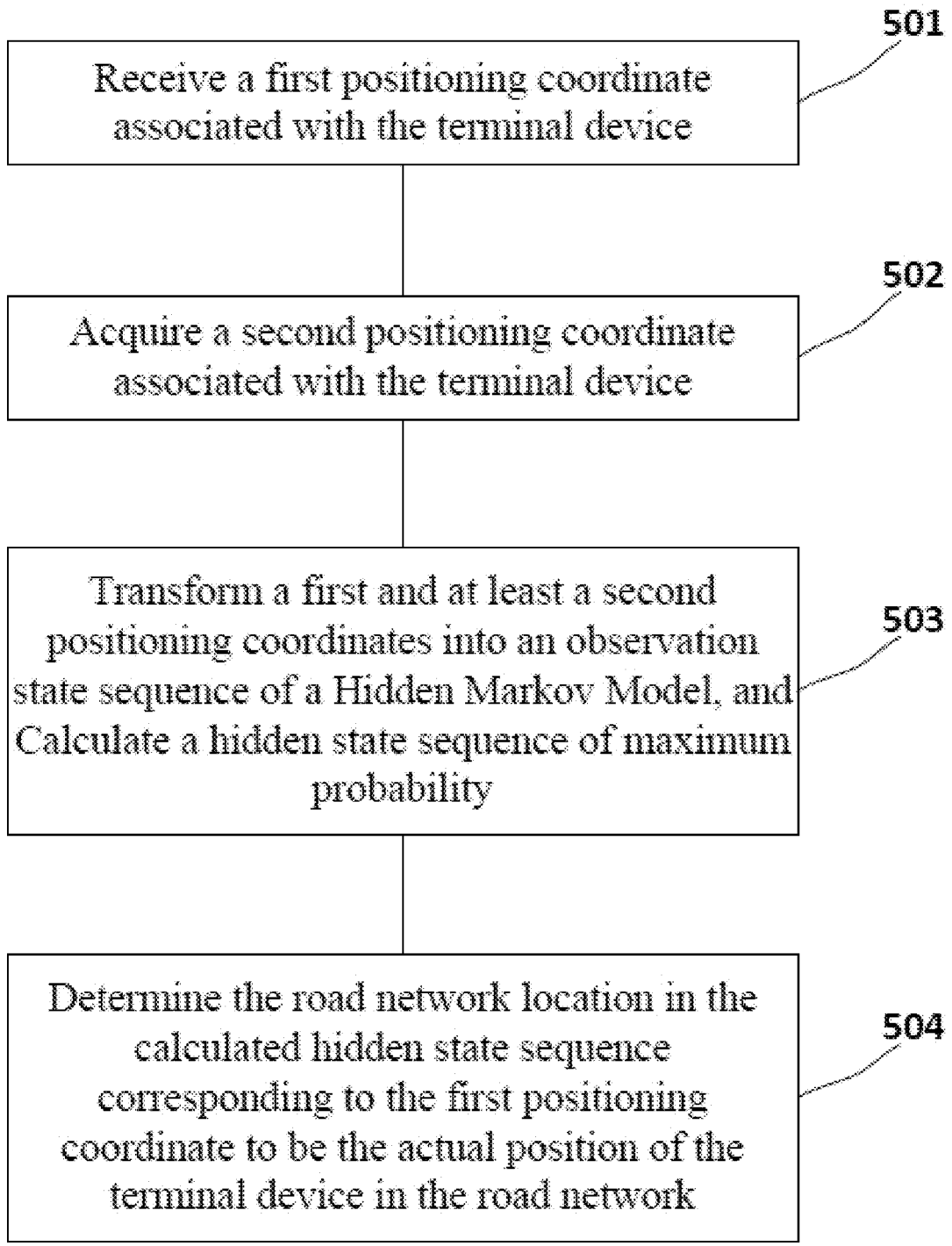
FIG. 5 illustrates a flowchart of an exemplary positioning scheme using a Hidden Markov Model ("HMM"), according to embodiments of the disclosure.

FIG. 5 illustrates a flowchart of an exemplary positioning scheme using a Hidden Markov Model ("HMM"). This exemplary positioning scheme may include Steps 501-504 shown in FIG. 5 and other steps not shown in FIG. 5. It is to be appreciated that some of the steps may be optional to perform the disclosure provided herein. Further, some of the steps may be performed simultaneously, or in a different order than shown in FIG. 5 or discussed herein.

At Step 501, the system according to the present disclosure may receive a first positioning coordinate associated with the terminal device. For example, the first positioning coordinate may be embodied in the current position information received by the abovementioned receiving module. At Step 502, the system according to the present disclosure may acquire at least a second positioning coordinate associated with the terminal device. For example, the second positioning coordinate may be embodied in the historical position information acquired by the abovementioned acquisition module. The first and second positioning coordinates may include longitude value, latitude value, and time stamp when a terminal device transmits its positioning coordinate.

An example of the positioning coordinate uses GPS coordinates. However, the present disclosure should not be limited to this example alone. Other form of positioning coordinates, such as GLONASS coordinates, BeiDou coordinates, or any other coordinate in an established coordinate system may be applied to the present disclosure.

Figure 6:
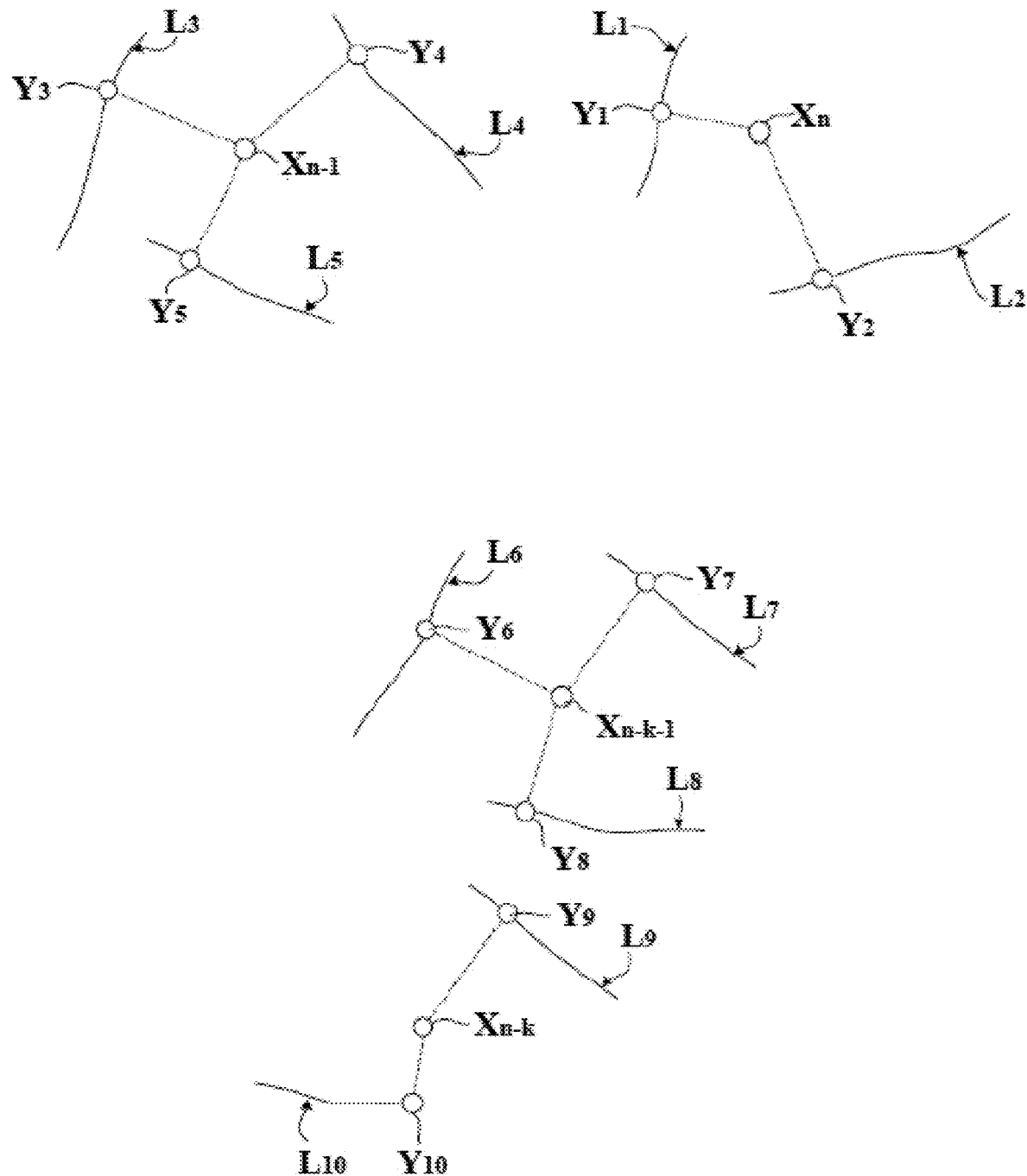
FIG. 6 illustrates an exemplary road network where several positioning coordinates are shown, according to embodiments of the disclosure.

FIG. 6 illustrates an exemplary road network where several positioning coordinates are shown. As shown in FIG. 6, some embodiments assume the location of the terminal device in the road network at time $T_n$ to be represented by a first coordinate $X_n$, and the historical locations of the same terminal device in the same road network at time points prior to $T_n$ to be represented by second coordinates $X_{n-1}$, $X_{n-2}, \ldots, X_{n-k}$, where k is the number of historical locations selected. Number k can be adjusted according to varying needs (such as the computer's performance index, the accuracy requirement, etc.). Generally speaking, the larger the number K is, the more accuracy in determining the actual position of the terminal device can be obtained.

Referring back to FIG. 5, at Step 503, the first and second positioning coordinates are transformed into an observation state sequence of an HMM, and a maximum probability hidden state sequence of the HMM is calculated. The hidden state included in the hidden state sequence is the road network corresponding to the first or second positioning coordinate.

HMM is a statistical model for describing a Markov process with hidden states. With respect to real-world applications where the actual position of a driver (that is, mapped location in the road network) is determined via positioning coordinates, the positioning coordinates transmitted from the terminal device used by the driver are the observable states, and the road network locations corresponding to the transmitted positioning coordinates are the hidden states of the HMM. In some embodiments, a location in a road network is represented as {LinkId, Distance}, where LinkId is a unique identifier representing a path in the road network, and Distance represents the surface distance from the road network location to an end point (starting point or ending point) of a path corresponding LinkId.

With reference back to FIG. 6, when the terminal device transmits its first positioning coordinate $X_n$ at time $T_n$, the road network location of the terminal device is determined based on $X_n$. For each positioning coordinate, there exists certain probability that the positioning coordinate is mapped to one or more road network locations. In some embodiments, one or more paths with proximity to the positioning coordinate may be determined to be the potential road(s). Each potential road includes a road network location corresponding to the positioning coordinate.

As shown in FIG. 6, potential roads surrounding the positioning coordinate $X_n$ include L1 and L2. If the road network location corresponding to the positioning coordinate is determined by using, for example, the shortest distance method, then perpendicular lines are drawn from positioning coordinate $X_n$ to roads $L_1$ and $L_2$ respectively, which intersects roads $L_1$ and $L_2$ at road network locations $Y_1$ and $Y_2$ respectively. The present disclosure is not limited to the example in FIG. 6. In real-world applications, potential roads corresponding to a positioning coordinate may be unlimited, especially in some complex road networks. The purpose is to choose the most probable road network location among all possible road network locations $Y_1$, $Y_2$, ..., and $Y_n$.

Figure 7:
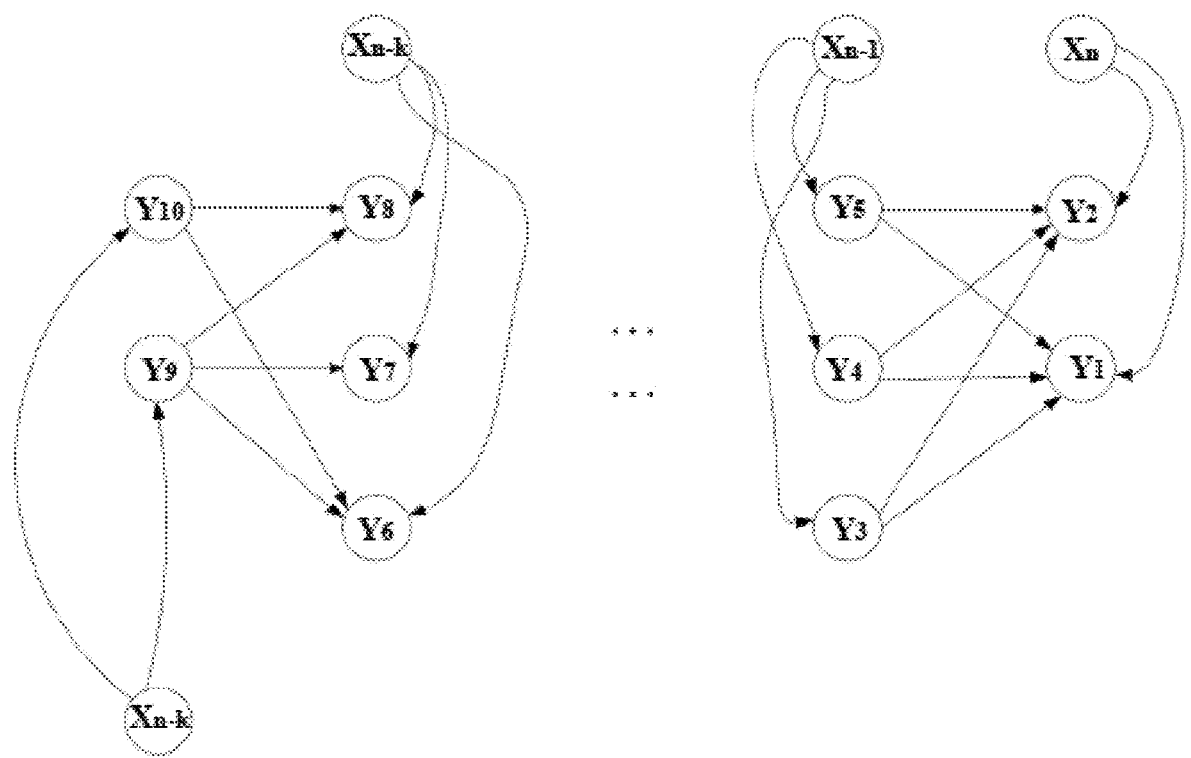
FIG. 7 illustrates an HMM corresponding to the exemplary road network shown in FIG. 6, according to embodiments of the disclosure.

FIG. 7 illustrates an HMM corresponding to the exemplary road network shown in FIG. 6. The HMM includes both an observation state sequence and a hidden state sequence. The observation state sequence in accordance with time sequence is:

$$\{X_{n-k}, X_{n-k-1}, \ldots, X_{n-1}, X_n\};$$

and the hidden state sequence in accordance with time sequence is:

$$\{Y_{n-k}, Y_{n-k-1}, \ldots, Y_{n-1}, Y_n\},$$

where $Y_n$ is the road network location that $X_n$ may be mapped to. For example and with reference to FIG. 6, $Y_n$ includes $Y_1$ and $Y_2$ with respect to $X_n$; $Y_{n-1}$ includes $Y_3$, $Y_4$, and $Y_5$ with respect to $X_{n-1}$.

An "observation probability" of the HMM is defined as the probability that a hidden state may be observed as a given observable state. A "transition probability" of the HMM is defined as the probability that a prior hidden state may transition to a next hidden state. To give an example, with respect to $X_{n-1}$, the probability that $X_{n-1}$ is mapped to road network locations $Y_3$, $Y_4$, and $Y_5$ is the observation probability of the HMM; the probability that any one of the hidden states $Y_3$, $Y_4$, and $Y_5$ transitions to any one of the hidden states $Y_1$ and $Y_2$ is the transition probability of the HMM. According to time sequence, any one of the hidden states $Y_3$, $Y_4$, and $Y_5$ is called a "prior hidden state," while any one of the hidden states $Y_1$ and $Y_2$ is called a "next hidden state." The prior hidden state and the next hidden state are relatively speaking with respect to each other.

For any known observation state sequence, the maximum probability hidden state sequence corresponding to the known observation state sequence can be calculated using specific algorithms. In some embodiments, a function for calculating the maximum probability hidden state sequence is as follows:

$$(Y_{n-k}, Y_{n-k-1}, \ldots, Y_{n-1}, Y_n) = \text{ArgMax} \, \Pi_{i=0}^{k} P(X_{n-i}|Y_{n-i}) * P(Y_{n-i}|Y_{n-i-1}),$$

where $P(X_{n-i}|Y_{n-i})$ represents observation probability, and $P(Y_{n-i}|Y_{n-i-1})$ represents the transition probability.

Consistent with the present disclosure, the observation probability of the HMM is inversely correlated (e.g. inversely proportional) to the distance (e.g. shortest distance) between a positioning coordinate and each road network. For example and with reference to FIG. 6, assuming the shortest distance (i.e. perpendicular distance) from $X_n$ to $L_1$ is 5 meters and that from $X_n$ to $L_2$ is 10 meters, the observation probability may be calculated as follows:

$$P(X_n|Y1) \approx 0.667;$$

$$P(X_n|Y2) \approx 0.333.$$

Consistent with the present disclosure, the transition probability of the HMM is inversely correlated to the distance between a prior road network location and a next road network location. Optionally, the transition probability of the HMM is inversely correlated to the shortest road surface distance or straight-line distance between a prior road network location and a next road network location. The "shortest road surface distance" refers to the shortest distance between two road network locations when one travels along the road surface. If one does not travel along the road surface, the straight-line distance between the two road network locations may be deemed as the shortest distance. The prior road network location is the prior hidden state of the HMM, and the next road network location is the next hidden state of the HMM. For example and again with reference to FIG. 6, assuming the shortest road surface distance from $Y_3$ to $Y_1$ is 5 meters, that from $Y_4$ to $Y_1$ is 10 meters, and that from $Y_5$ to $Y_1$ is 15 meters, the transition probability may be calculated as follows:

$$P(Y1|Y3) = 0.5;$$

$$P(Y1|Y4) = 0.333;$$

$$P(Y1|Y5) = 0.167.$$

In some embodiments, the observation probability and the transition probability of the HMM may be determined by other means. For example, they can be determined using road network topology. If a route is determined to be disconnected, the transition probability corresponding to the disconnected route is set as 0 or close to 0. Alternatively, if a currently congested road which a driver will be highly unlikely to travel through is determined to be the route, the observation probability that any road network location is mapped to this route may be substantially lowered. Furthermore, in some embodiments, a combination of road network topology and distance calculation may be applied to the determination of the observation probability and the transition probability of the HMM.

In some embodiments consistent with the present disclosure, Viterbi algorithm may be used to calculate the most likely hidden state sequence of the HMM. The Viterbi algorithm may reduce the complexity of calculation and lead to the optimal (e.g., the maximum probability) hidden state sequence according to the observation state sequence. In some embodiments, a Forward algorithm may also be used to calculate the most likely hidden state sequence, which will not be elaborated herein.

Referring back to FIG. 5, at Step 504, the actual position of the terminal device in the road network is determined to be the road network location in the calculated hidden state sequence corresponding to the first positioning coordinate.

Again with reference to FIG. 7, assuming the calculated optimal (e.g., the maximum probability) hidden state sequence is as follows:

$$\{Y_9, Y_7, \ldots, Y_3, Y_2\};$$

then the present location of the driver is determined to be $Y_2$.

The above embodiments demonstrate how a present location of a terminal device is determined using an HMM.

These embodiments can effectively improve the positioning accuracy by eliminating the influence of environmental factors to the positioning accuracy.

Figure 8:
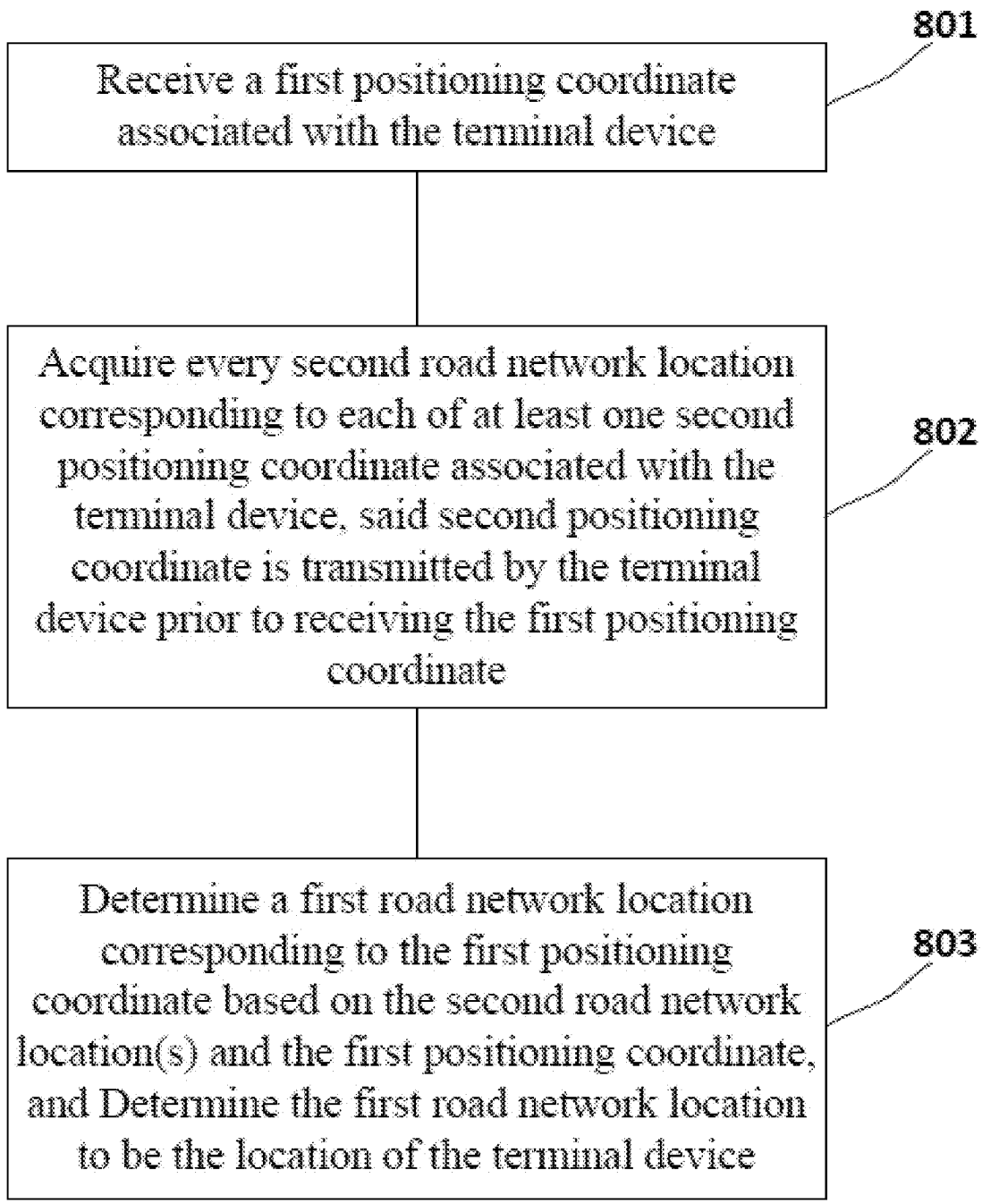
FIG. 8 illustrates a flowchart of another exemplary positioning scheme using the HMM, according to embodiments of the disclosure.

FIG. 8 illustrates a flowchart of another exemplary positioning scheme using the HMM. This positioning scheme is applicable to various types of severs (e.g., rideshare services server, navigation application server, etc.). This exemplary positioning scheme may include Steps 801-803 shown in FIG. 8 and other steps not shown in FIG. 8. It is to be appreciated that some of the steps may be optional to perform the disclosure provided herein. Further, some of the steps may be performed simultaneously, or in a different order than shown in FIG. 8 or discussed herein.

At Step 801, a first positioning coordinate from the terminal device is received. The first positioning coordinate may be a positioning coordinate transmitted from the terminal device at time $T_n$ (that is, the current time). The terminal device may transmit the positioning coordinates at certain frequency.

At Step 802, every second road network location corresponding to each of at least one second positioning coordinate associated with the terminal device is acquired, and the second positioning coordinate is transmitted by the terminal device prior to receiving the first positioning coordinate. The second road network location(s) is determined by an HMM.

Consistent with the embodiments under the present disclosure, the backend receives one or more second positioning coordinates before the first positioning coordinate is transmitted to the backend. Assuming the number of second positioning coordinates that need to be acquired is k, the backend receives second positioning coordinates respectively at time $T_{n-k}, T_{n-k-1}, \ldots,$ and $T_{n-1}$.

Since the HMM calculation of road network locations corresponding to positioning coordinates is time-consuming to certain extent, it can cost a decent amount of time if every maximum probability road network location corresponding to each of the second positioning coordinates is calculated after the first positioning coordinate is acquired. Particularly for various types of online navigation applications, it is desired to have immediate responses to user operations and to determine as soon as possible the road network locations corresponding to the positioning coordinates. Therefore, it is preferable to calculate, by taking advantage of HMM, every road network location corresponding to each of the second positioning coordinates before determining the road network location corresponding to the first positioning coordinate.

In these embodiments, each time the backend receives a positioning coordinate from the terminal device, it retrieves and uses the HMM calculation in order to determine and record the maximum probability road network location corresponding to the latest received positioning coordinate. It is noted that the HMM calculation can be referenced to the descriptions above in conjunction with FIG. 5 and will not be elaborated herein.

At Step 803, a first road network location corresponding to the first positioning coordinate is determined based on the second road network location(s) and the first positioning coordinate, and the first road network location is determined to be the location of the terminal device. The first road network location is determined using an HMM.

When the second road network location(s) corresponding to each of the second positioning coordinates is acquired by advance calculation, the HMM can again be applied to calculating the first road network location corresponding to the second positioning coordinates. In some embodiments, the observation probability of the HMM is inversely correlated to the distance between a positioning coordinate and each road network. The transition probability of the HMM is inversely correlated to the distance between a prior road network location and a next road network location.

The embodiments according to the current disclosure may be applied to navigation applications and apparatuses. A navigation application or apparatus according to the present disclosure includes one or more modules and/or processors configured to carry out the following steps: receiving a navigation request to a destination, determining an actual position of a terminal device, planning a navigation route from the actual position of the terminal device to the destination, where the determination of the actual position may utilize the various embodiments disclosed herein.

The navigation application and apparatus are particularly instrumental to rideshare services, as the driver can precisely determine his/her own location or the passenger's location using this method. The navigation route can be calculated on the terminal device or transmitted to the terminal device after being calculated over the cloud or at the server. The overall service quality and user experience of the online hailing platform can be greatly enhanced.

Figure 9:
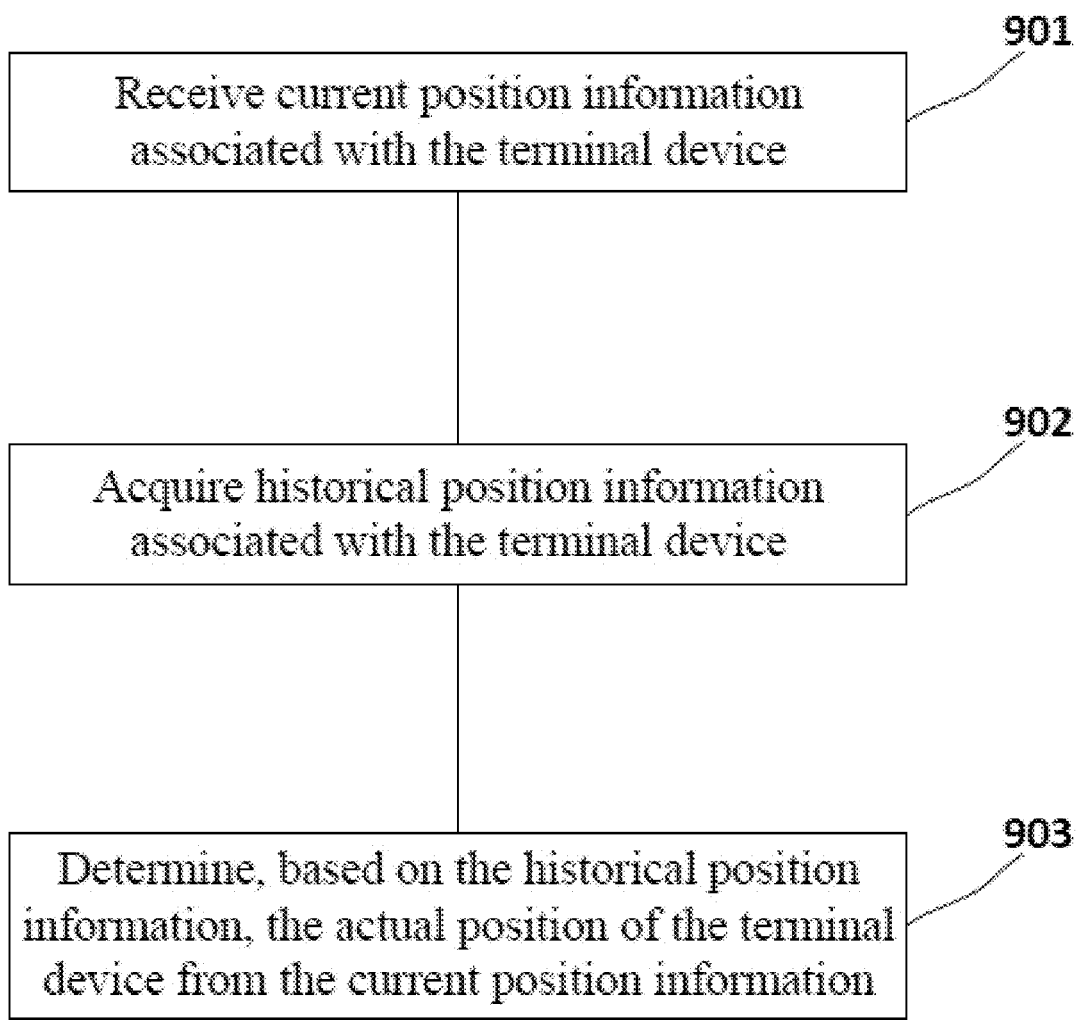
FIG. 9 illustrates a flowchart of an exemplary method for determining a position of a terminal device, according to embodiments of the disclosure.

FIG. 9 illustrates a flowchart of an exemplary method 900 for determining a position of a terminal device, according to embodiments of the disclosure.

Method 900 may be implemented by a terminal device, a system combining a terminal device and a backend, or other apparatuses or devices compatible with the intended purpose of the current disclosure. Method 900 may include Steps 901-903 shown in FIG. 9 and other steps not shown in FIG. 9. It is to be appreciated that some of the steps may be optional to perform the disclosure provided herein. Further, some of the steps may be performed simultaneously, or in a different order than shown in FIG. 9 or discussed herein.

Method 900 may be specifically directed to a process of determining a position of a terminal device, such as terminal device 100. The configuration and function of terminal device 100 are described in detail in conjunction with FIG. 1, which will not be repeated here.

At Step 901, current position information associated with the terminal device may be received. The current position information may include one or more positions indicative of the present location of the terminal device.

At Step 902, historical position information associated with the terminal device may be acquired. The historical position information may be separated from the current position information by a predetermined time interval. The predetermined time interval may be set as 5 seconds, 2 minutes, or any other value that meaningfully differentiates the current and historical position information. The historical position information can be a moving trajectory of the terminal device that includes all traveled positions, or can alternatively be one or more positions of the terminal device.

At Step 903, the actual position of the terminal device may be determined, based on the historical position information, from the current position information. For example, the actual position of the terminal device can be obtained by determining which position among the one or more positions embodied in the current position information is the closest to the present location of the terminal device. Alternatively, the actual position of the terminal device can be obtained by calculating the moving tendency of the terminal device based on a historical moving trajectory or multiple historical positions of the terminal device.

Method 900 may include sampling positioning data from the terminal device. The positioning data may be used to calculate the current position information. Method 900 may include transmitting the positioning data to a backend, which may calculate current position information based on the positioning data. The calculation may take into account one or more types of positioning data, such as the GPS data, base station data, Wi-Fi data, etc.

Consistent with some embodiments according to the present disclosure, method 900 may include determining a starting time that is separated by the predetermined time interval from the time of receiving the current position information. Once the starting time is available, method 900 may further obtain the initial position information of the terminal device at the starting time.

Method 900 may include acquiring a moving trajectory of the terminal device during the predetermined time interval. The moving trajectory can be calculated using computerized applications of algorithms, for example, dead reckoning. For example, when the user is a passenger, the moving trajectory can be calculated using the PDR algorithm. Sensors onboard the terminal device carried by the passenger may detect the step length, number of steps, direction, and other motion data of the passenger. Thus, the moving trajectory of the terminal device can be calculated with the PDR algorithm based on such data. Types of sensors onboard the terminal device include accelerometer, gyroscope, magnetometer, etc.

Method 900 may include determining the historical position information of the terminal device based on the moving trajectory of the terminal device. To achieve higher accuracy of the generated moving trajectory of the terminal device as opposed to its actual moving trajectory, two or more acquired moving trajectories can be cross referenced to reduce errors and deviation.

Consistent with some embodiments according to the present disclosure, method 900 may include determining an ending point of a moving trajectory. Depending on the number of moving trajectories, there can be one or more ending points in one calculation. These one or more ending points are collectively embodied in the ending position information, which in turn constitutes the historical position information.

Method 900 may include determining the actual position of the terminal device by comparing the ending position information with the current position information. The comparison can be carried out in multiple ways. One example is to calculate the distances between the ending point (embodied in the ending position information) and each of the one or more positions indicative of the present location of the terminal device (embodied in the current position information). As one exemplary and non-limiting selection criterion, the position with the shortest distance from the ending point is determined to be the actual position of the terminal device. The other example is to use a moving tendency of the terminal device to find the actual position from the current position information. As one exemplary and non-limiting selection criterion, the position that falls within most proximity to the calculated moving tendency is determined to be the actual position of the terminal device.

Consistent with some embodiments according to the present disclosure, the current position information in method 900 may include a first positioning coordinate associated with the terminal device, and the historical position information in method 900 may include a second positioning coordinate associated with the terminal device.

Method 900 may include transforming the first positioning coordinate and the second positioning coordinate respectively into an observation state sequence of a Hidden Markov Model, calculating a hidden state sequence of maximum probability, where the hidden state sequence includes hidden states representative of road networks corresponding to the first positioning coordinate and the second positioning coordinate, and determining the actual position of the terminal device in a road network corresponding to the first positioning coordinate.

Consistent with some embodiments according to the present disclosure, an observation probability of the HMM is inversely correlated to the distance between a positioning coordinate and each road network.

Consistent with some embodiments according to the present disclosure, a transition probability of the HMM is inversely correlated to the distance between a prior road network location and a next road network location.

One aspect of the present disclosure is directed to a positioning application or apparatus embodying the systems or methods as discussed above. The application or apparatus is equipped with one or more processors and/or modules configured to carry out the various functions and/or steps disclosed in the system and method embodiments within the present disclosure.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc, a flash drive, or a solid-state drive having the computer instructions stored thereon.

It will be apparent to those skilled in the art that various modifications and variations can be made to the disclosed system and related methods. Other embodiments will be apparent to those skilled in the art from consideration of the specification and practice of the disclosed systems and related methods.

It is intended that the specification and examples be considered as exemplary only, with a true scope being indicated by the following claims and their equivalents.

What is claimed is:
1. A system for determining a position of a terminal device, comprising:
one or more storage devices including a set of instructions; and
one or more processors configured to communicate with the one or more storage devices, wherein when executing the set of instructions, the one or more processors are configured to cause the system to:
receive current position information associated with the terminal device, the current position information including one or more positions indicative of a present location of the terminal device;
acquire historical position information associated with the terminal device, the historical position information being separated from the current position information by a predetermined time interval;
transform the current position information and the historical position information respectively into an observation state sequence of a Hidden Markov Model;
calculate a hidden state sequence of maximum probability, the hidden state sequence including hidden states representative of road networks corresponding to the current position information and the historical position information; and determine the present position of the terminal device in a road network corresponding to the current position information.

2. The system of claim 1, wherein when executing the set of instructions, the one or more processors are configured to cause the system to:

sample positioning data from the terminal device, the positioning data being used to calculate the current position information.

3. The system of claim 1, wherein when executing the set of instructions, the one or more processors are configured to cause the system to:

determine a starting time that is separated by the predetermined time interval from a time of receiving the current position information;

obtain initial position information of the terminal device at the starting time;

acquire a moving trajectory of the terminal device during the predetermined time interval; and determine the historical position information of the terminal device based on the moving trajectory of the terminal device.

4. The system of claim 3, wherein the acquisition of the moving trajectory of the terminal device is based on motion data from one or more sensors onboard the terminal device.

5. The system of claim 3, wherein when executing the set of instructions, the one or more processors are configured to cause the system to:

determine an ending point of the moving trajectory, and determine the present position of the terminal device by comparing ending position information with the current position information, wherein:

the ending position information includes one or more ending points.

6. The system of claim 5, wherein the comparing is carried out by calculating a distance between the ending position information and the current position information, or calculating proximity between a moving tendency associated with the moving trajectory and the current position information.

7. The system of claim 1, wherein:

the current position information includes a first positioning coordinate associated with the terminal device, the historical position information includes a second positioning coordinate associated with the terminal device, and wherein the hidden state sequence includes hidden states representative of the road networks corresponding to the first positioning coordinate and the second positioning coordinate, wherein the present position of the terminal device is determined in the road network corresponding to the first positioning coordinate.

8. The system of claim 7, wherein an observation probability of the Hidden Markov Model is inversely correlated to a distance between a positioning coordinate and each road network.

9. The system of claim 7, wherein a transition probability of the Hidden Markov Model is inversely correlated to a distance between a prior road network location and a next road network location.

10. A method for determining a position of a terminal device implemented on a machine having one or more processors and one or more storage devices, comprising:

receiving, by the one or more processors, current position information associated with the terminal device, the current position information including one or more positions indicative of a present location of the terminal device;

acquiring, by the one or more processors, historical position information associated with the terminal device, the historical position information being separated from the current position information by a predetermined time interval;

transform, by the one or more processors, the current position information and the historical position information respectively into an observation state sequence of a Hidden Markov Model;

calculating, by the one or more processors, a hidden state sequence of maximum probability, the hidden state sequence including hidden states representative of road networks corresponding to the current position information and the historical position information; and determining, by the one or more processors, the present position of the terminal device in a road network corresponding to the current position information.

11. The method of claim 10, further comprising:

sampling, by the one or more processors, positioning data from the terminal device, the positioning data being used to calculate the current position information.

12. The method of claim 10, further comprising:

determining, by the one or more processors, a starting time that is separated by the predetermined time interval from a time of receiving the current position information;

obtaining, by the one or more processors, initial position information of the terminal device at the starting time;

acquiring, by the one or more processors, a moving trajectory of the terminal device during the predetermined time interval; and determining, by the one or more processors, the historical position information of the terminal device based on the moving trajectory of the terminal device.

13. The method of claim 12, wherein acquiring the moving trajectory of the terminal device uses motion data from one or more sensors onboard the terminal device.

14. The method of claim 12, further comprising:

determining, by the one or more processors, an ending point of the moving trajectory; and determining, by the one or more processors, the present position of the terminal device by comparing ending position information with the current position information, wherein:

the ending position information includes one or more ending points.

15. The method of claim 14, wherein the comparing is carried out by calculating a distance between the ending position information and the current position information, or calculating proximity between a moving tendency associated with the moving trajectory and the current position information.

16. The method of claim 10, wherein the current position information includes a first positioning coordinate associated with the terminal device, the historical position information includes a second positioning coordinate associated with the terminal device, wherein the hidden state sequence includes hidden states representative of road networks corresponding to the first positioning coordinate and the second positioning coordinate, and wherein the present position of the terminal device is determined in the road network corresponding to the first positioning coordinate.

17. The method of claim 16, wherein an observation probability of the Hidden Markov Model is inversely correlated to a distance between a positioning coordinate and each road network.

18. The method of claim 16, wherein a transition probability of the Hidden Markov Model is inversely correlated to a distance between a prior road network location and a next road network location.

19. A non-transitory computer-readable medium comprising instructions stored thereon that, wherein when executed by one or more processors, the instructions causes the one or more processors to perform a method for determining a position of a terminal device, the method comprising:
    sampling positioning data from the terminal device, the positioning data being used to calculate current position information associated with the terminal device,
    receiving current position information associated with the terminal device, the current position information including one or more positions indicative of a present location of the terminal device;
    acquiring historical position information associated with the terminal device, the historical position information being separated from the current position information by a predetermined time interval;
    transform the current position information and the historical position information respectively into an observation state sequence of a Hidden Markov Model;
    calculating a hidden state sequence of maximum probability, the hidden state sequence including hidden states representative of road networks corresponding to the current position information and the historical position information; and
    determining, by the one or more processors, the present position of the terminal device in a road network corresponding to the current position information.

20. The computer-readable medium of claim 19, wherein the current position information includes a first positioning coordinate associated with the terminal device, the historical position information includes a second positioning coordinate associated with the terminal device,
    wherein the hidden state sequence includes hidden states representative of road networks corresponding to the first positioning coordinate and the second positioning coordinate, and
    wherein the present position of the terminal device is determined in the road network corresponding to the first positioning coordinate.

\* \* \* \* \*